United States Patent [19]
Thing

[11] B 3,930,221
[45] Dec. 30, 1975

[54] EXHAUST BACKPRESSURE WARNING SYSTEM

[76] Inventor: Frank Thing, P.O. Box 35, Guatay, Calif. 92031

[22] Filed: Mar. 9, 1973

[21] Appl. No.: 339,838

[44] Published under the Trial Voluntary Protest Program on January 28, 1975 as document no. B 339,838.

[52] U.S. Cl............ 340/52 R; 123/198 D; 137/557; 340/240
[51] Int. Cl.² ...................... B60Q 1/00; F02B 77/10
[58] Field of Search............ 340/52 R, 60, 243, 240; 123/198 D; 180/103; 60/277; 200/83 N, 83 W, 81.9 R; 137/557

[56] References Cited
UNITED STATES PATENTS

| | | | |
|---|---|---|---|
| 1,266,627 | 5/1918 | Renne | 137/557 |
| 2,253,425 | 8/1941 | Garland | 340/60 |
| 3,223,068 | 12/1965 | Van Winkle | 137/557 |
| 3,548,591 | 12/1970 | McKay | 60/29 |

*Primary Examiner*—Glen R. Swann, III
*Attorney, Agent, or Firm*—Ralph S. Branscomb

[57] ABSTRACT

A warning system comprises a pressure switch operably connected to the exhaust system of an internal combustion engine and activating a warning signal upon the occurrence of an abnormally high pressure in the exhaust system.

2 Claims, 3 Drawing Figures

EXHAUST BACKPRESSURE WARNING SYSTEM

BACKGROUND OF THE INVENTION

The present invention relates to exhaust pressure warning systems for internal combustion engines, and particularly for automobile engines.

A typically constructed internal combustion engine for a automobile has mounted over the cylinder exhaust valves an exhaust manifold communicating with an exhaust pipe, a muffler, and a tail pipe whereby engine exhaust is collected and conducted to the atmosphere. The tailpipe, muffler, and often the exhaust pipe, are mounted to the underframe of the automobile and are thus subject to denting and bending from encounters with roadway objects and other obstacles, resulting in partial obstruction of the exhaust system. Blocking of the system can also occur from the buildup of carbon or other products of incomplete combustion from the engine, or from clogging substances such as soil becoming jammed into the open-ended tail pipe. When the exhaust system is so obstructed, serious operational problems are encountered.

The inability of the engine to efficiently rid itself of the hot burned gases causes engine overheating. The increased pressure may blow out the manifold gasket, causing an exhaust leak which creates a carbon monoxide hazard to passengers in the vehicle.

The backpressure at the exhaust valves causes incomplete fuel combustion with several attendant problems. Most importantly, unburned carbon will cake on the cylinder walls and around the valves, causing the piston rings to wear and the valves to seat improperly so that loss of compression occurs and the valves are eroded by exhaust seepage, eventually resulting in the necessity for expensive repairs. In addition, more fuel is required since fuel combustion is incomplete and gas mileage is reduced. The unburned particles further clog the exhaust, compounding the abovementioned problems, and are emitted into the atmosphere causing pollution.

SUMMARY OF THE INVENTION

The present invention eliminates the abovementioned problems by alerting the driver or operator wherever blockage occurs in the exhaust system so that the defect can be remedied before consequential problems develop. The warning system comprises a pressure sensor which communicates with the exhaust system of an internal combustion engine and is activated by an abnormally high pressure in the manifold, and a signal device triggered by the pressure sensor and positioned to alert the engine operation of abnormal manifold pressure.

DETAILED DESCRIPTION OF THE PREFERRED EMBODIMENTS

Figure 1:
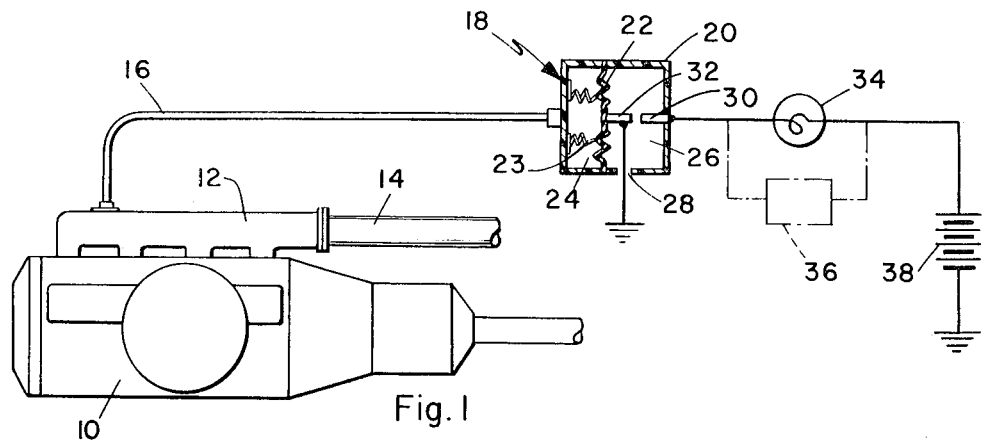
FIG. 1 is a diagrammatic view of the warning means coupled to a single exhaust system.

FIG. 1 is a diagrammatic drawing revealing the theoretical operation of the device. The internal combustion engine 10 has mounted thereon an exhaust manifold 12, connected to an exhaust pipe 14, and a muffler and tail pipe, not shown in this figure. Communicating with the exhaust system is a duct 16 which connects the manifold 12 to a pressure sensor 18. It is to be noted that the apparatus would operate equally well if the duct 16 were connected to exhaust pipe 14 or between the exhaust pipe and manifold, and the duct 16 could be eliminated entirely by mounting the pressure sensor directly on the exhaust system but this is not the preferred embodiment.

Pressure sensor 18 could be any appropriate pressure sensitive device, and as described comprises a cylindrical casing 20 divided by a diaphram 22 into a chamber 24 which communicates with duct 18 and a chamber 26 which opens to the atmosphere through port 28. The casing 20 has mounted thereon and insulated therefrom an electrical contact 30, which is aligned with a grounded contact 32 which is mounted on diaphragm 22 and biased away from contact 30 by spring means 23, the spring means possibly being the resistance of the diaphram 22 to deformation. A signal device such as light 34 or an audio alarm 36 is electrically connected to contact 32 and a grounded battery 38.

In operation when the pressure in the exhaust manifold exceeds a predetermined level, exhaust gases at a similar pressure in chamber 24 displace the diaphragm 22 away from the retaining springs 23 so that the contact 30 and 32 make contact, causing the battery 38 to energize the signal device and alert the engine operator to the excessive exhaust pressure.

Figure 2:
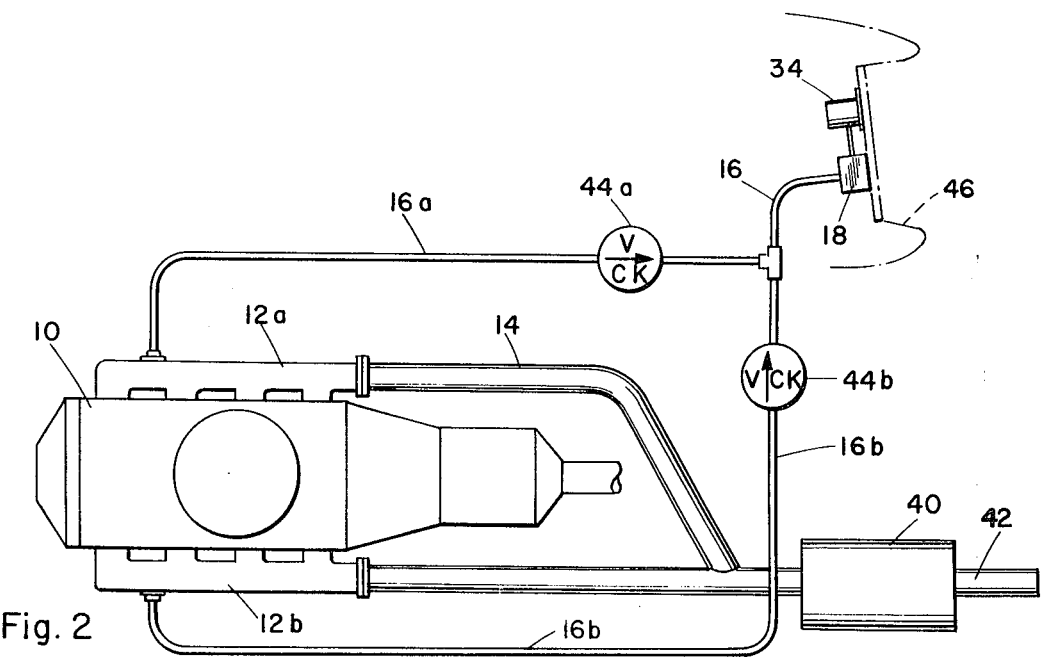
FIG. 2 is a diagrammatic view of the warning means coupled to a dual manifold, single exhaust system.

FIG. 2 shows an embodiment of the invention to accomodate an engine with two manifolds leading to one muffler 40 and tail pipe 42, wherein duct 16 branches into ducts 16A and 16B for separate connection to exhaust manifolds 12A and 12B. Oneway valves 44A and 44B are mounted within the ducts 16A and 16B respectively and allow the flow of exhaust only from the manifold to the pressure sensor 18, so that the pressure at the sensor will not be an average of the pressure in the manifold 12A and 12B, but will equal the pressure of the higher pressured manifold. For simplicity, pressure sensor 18 and signal means 34 are shown mounted on instrument panel 46, although in a more economical arrangement the pressure sensor would be in the engine compartment, mounted on the firewall or otherwise, and connected to signal means 34 by wiring.

Figure 3:
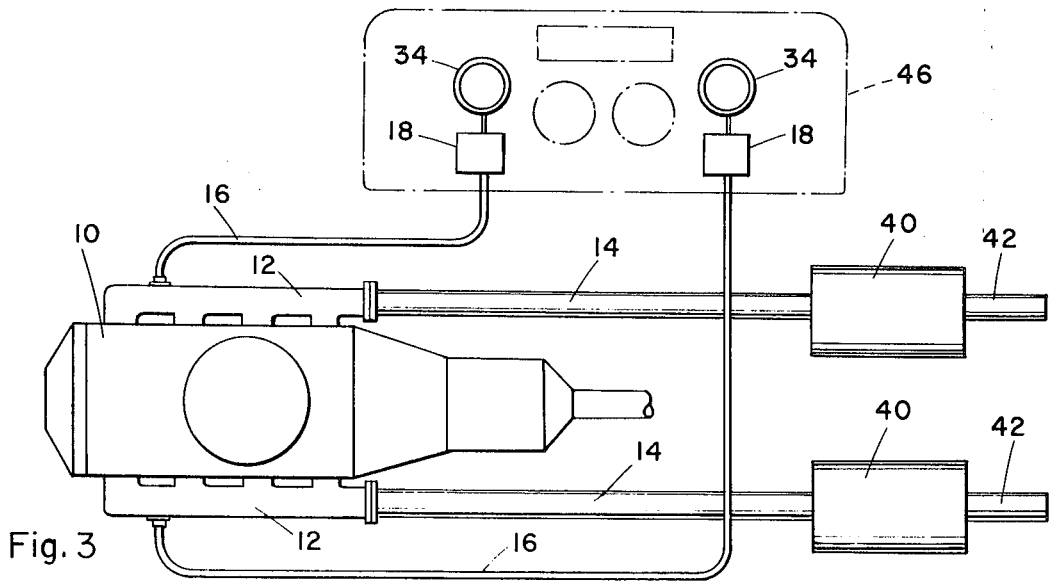
FIG. 3 illustrates the adaption of the warning means to a dual exhaust system.

FIG. 3 shows a further embodiment for an engine having separate exhaust systems comprising a dual exhaust manifolds 12, dual exhaust pipes 14, and dual mufflers 40 and tail pipes 42. Each exhaust system has a separate duct 16, pressure sensor 18, and signal device 34 so that the engine operator is alerted to the abnormal exhaust pressure and can also identify the particular manifold affected.

These representations of the warning systems are illustrative only, covering installation of the system in the more common type of exhaust systems. The invention would, of course, be adaptable to other types of exhaust systems not specifically discussed herein.

I claim:

1. An exhaust backpressure warning system for an internal combustion engine comprising:
    an exhaust system;
    a pressure sensor operably connected with said exhaust system and responsive to abnormally high pressure within said exhaust system; and a signal device activated by said sensor and positioned near the normal operating station of said engine to alert the operator thereof of an abnormally high pressure condition in said exhaust system.

2. The structure according to claim 1 wherein said exhaust system has more than one exhaust manifold communicating with a single tail pipe:

each of said exhaust manifolds having a duct in communication therewith and operably connected to the pressure sensor;

each of said ducts having a one way valve therein whereby a fluid in said duct can flow only toward said sensor.

* * * * *